United States Patent
Clark

(10) Patent No.: US 8,638,912 B2
(45) Date of Patent: *Jan. 28, 2014

(54) METHOD AND SYSTEM FOR ESTABLISHING A NEW ACCOUNT FOR A USER WITH AN ONLINE SERVICE

(75) Inventor: Bryan Clark, Westford, MA (US)

(73) Assignee: Red Hat, Inc., Raleigh, NC (US)

(\*) Notice: Subject to any disclaimer, the term of this patent is extended or adjusted under 35 U.S.C. 154(b) by 155 days.

This patent is subject to a terminal disclaimer.

(21) Appl. No.: 13/231,861

(22) Filed: Sep. 13, 2011

(65) Prior Publication Data

US 2012/0089732 A1    Apr. 12, 2012

Related U.S. Application Data

(63) Continuation of application No. 11/565,036, filed on Nov. 30, 2006, now Pat. No. 8,059,797.

(51) Int. Cl.
*H04M 11/00* (2006.01)

(52) U.S. Cl.
USPC ..................... 379/93.12; 705/26.1

(58) Field of Classification Search
USPC ........ 379/100.01, 88.11, 88.12, 88.17, 90.01; 705/30, 14.66, 14.13, 14.45, 1.1
See application file for complete search history.

(56) References Cited

U.S. PATENT DOCUMENTS

| | | | |
|---|---|---|---|
| 7,333,943 B1 * | 2/2008 | Charuk et al. | 705/26.1 |
| 7,467,096 B2 * | 12/2008 | Antonucci et al. | 705/14.27 |
| 7,848,966 B2 * | 12/2010 | Charuk et al. | 705/26.2 |
| 2002/0111942 A1 * | 8/2002 | Campbell et al. | 707/3 |
| 2002/0188509 A1 * | 12/2002 | Ariff et al. | 705/14 |
| 2004/0117277 A1 * | 6/2004 | Tagupa et al. | 705/30 |
| 2007/0106627 A1 | 5/2007 | Srivastava et al. | |
| 2008/0222013 A1 * | 9/2008 | Hansen et al. | 705/30 |
| 2008/0288336 A1 * | 11/2008 | Charuk et al. | 705/10 |

\* cited by examiner

*Primary Examiner* — Curtis Kuntz
*Assistant Examiner* — Maria El-Zoobi
(74) *Attorney, Agent, or Firm* — Lowenstein Sandler LLP

(57) ABSTRACT

A user is provided a temporary account and, in the event they choose to finalize joining a service, the user is permitted to save settings from their temporary account. For example, in some embodiments, the user is permitted to perform various functions, such as, browsing the service, navigating external links, and viewing various pages of other users and groups. This information and links may be transitioned over if the user wishes to establish a permanent account.

20 Claims, 3 Drawing Sheets

METHOD AND SYSTEM FOR ESTABLISHING A NEW ACCOUNT FOR A USER WITH AN ONLINE SERVICE

RELATED APPLICATION

This application is a continuation of U.S. patent application Ser. No. 11/565,036, filed Nov. 30, 2006, now U.S. Pat. No. 8,059,797 which is incorporated herein by reference.

FIELD OF THE INVENTION

The present invention relates to online services and communications tools and, more particularly, to social networks.

BACKGROUND OF THE INVENTION

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). Many of these sites try to build communities around multi-media or popular culture, such as television, film, music, etc. These sites and their features are designed to keep users clicking on advertising-supported pages of the site. Thus, the known social networking sites employ a closed platform of services that attempt to keep their user-base captive to the site.

Unfortunately, it can be difficult for users to maintain their multiplicity of accounts for their social networks. For example, users can have multiple profiles at multiple sites for their up with all of their accounts. For example, many users have four or five e-mail addresses, but essentially may use only one or two of them.

In addition, the Internet is crowded with a large number of social networking sites and sharing tools. For example, the recent supremacy of iTunes has triggered a plethora of music service offerings. As another example, the recent success of YouTube and Google Video has sparked an explosion of video-sharing sites.

Unfortunately, due to their current business model, the known social network sites are vulnerable to spammers and other forms of fraud. Thus, many closed social networking sites will likely become abandoned or a major hassle for users to maintain.

Accordingly, it may be desirable to provide methods and systems that serve as an open platform for users to maintain their personas across a plurality of social networking sites and online services. It may also be desirable to provide methods and systems that serve as an open overlay that serves as a consistent context by which users interact with social networking sites and online services.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and systems for allowing users to efficiently create new accounts in an online service. The new account creation scheme allows users to begin using aspects of the online service before creating an account. The user is provided a temporary account and, in the event they choose to finalize joining the service, the user is permitted to save settings from their temporary account. For example, in some embodiments, the user is permitted to perform various functions, such as, browsing the online service, navigating external links, and viewing various pages of other users and groups. The user may also be allowed to collect information on other members that they are interesting and may be offered a temporary homepage where the user can view the activities of these other members. The temporary home page allows the potential new user to immediately begin using the services of the social network service without having to specifically request a new account. This information and links may be transitioned over if the user wishes to establish a permanent account. While using the temporary account, however, the user must transition to a permanent account before accessing other features of the online service.

Reference will now be made in detail to the exemplary embodiments of the invention, which are illustrated in the accompanying drawings. Wherever possible, the same reference numbers will be used throughout the drawings to refer to the same or like parts.

Figure 1:
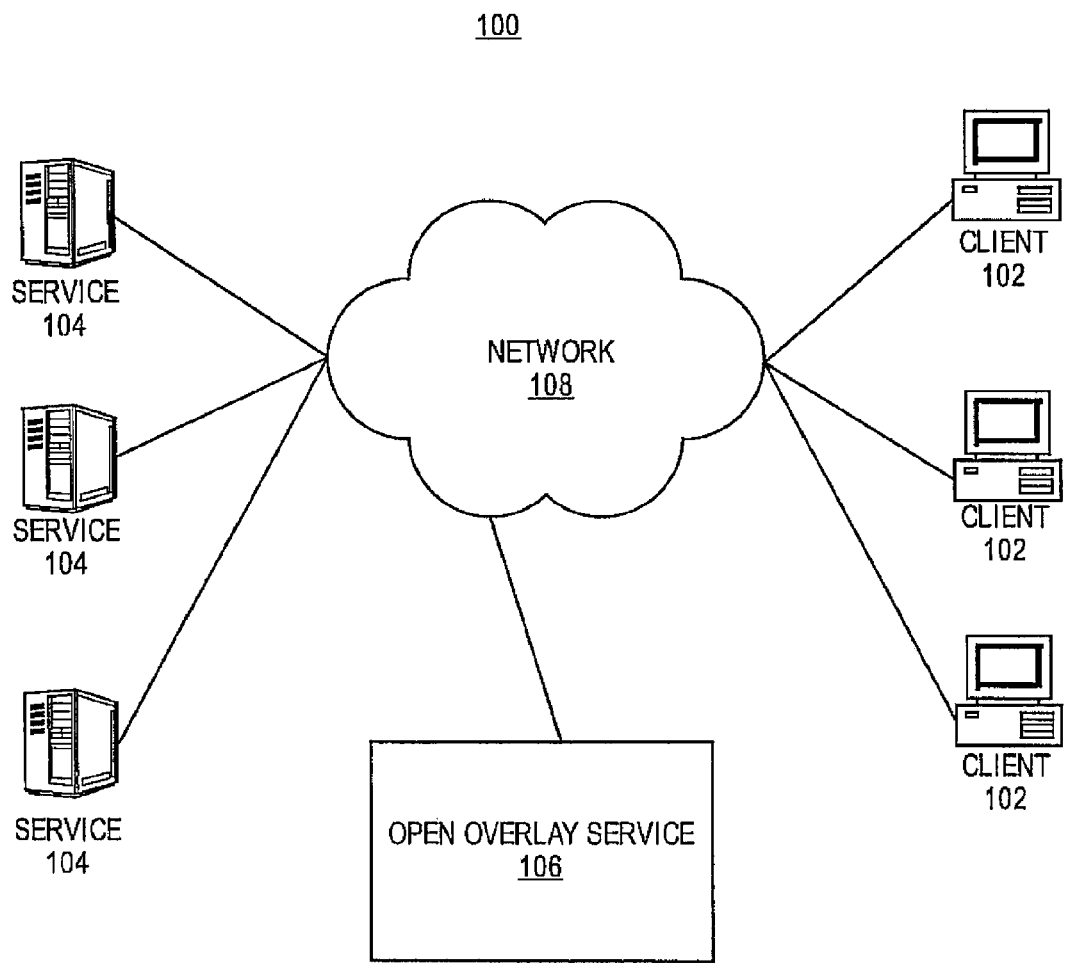
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
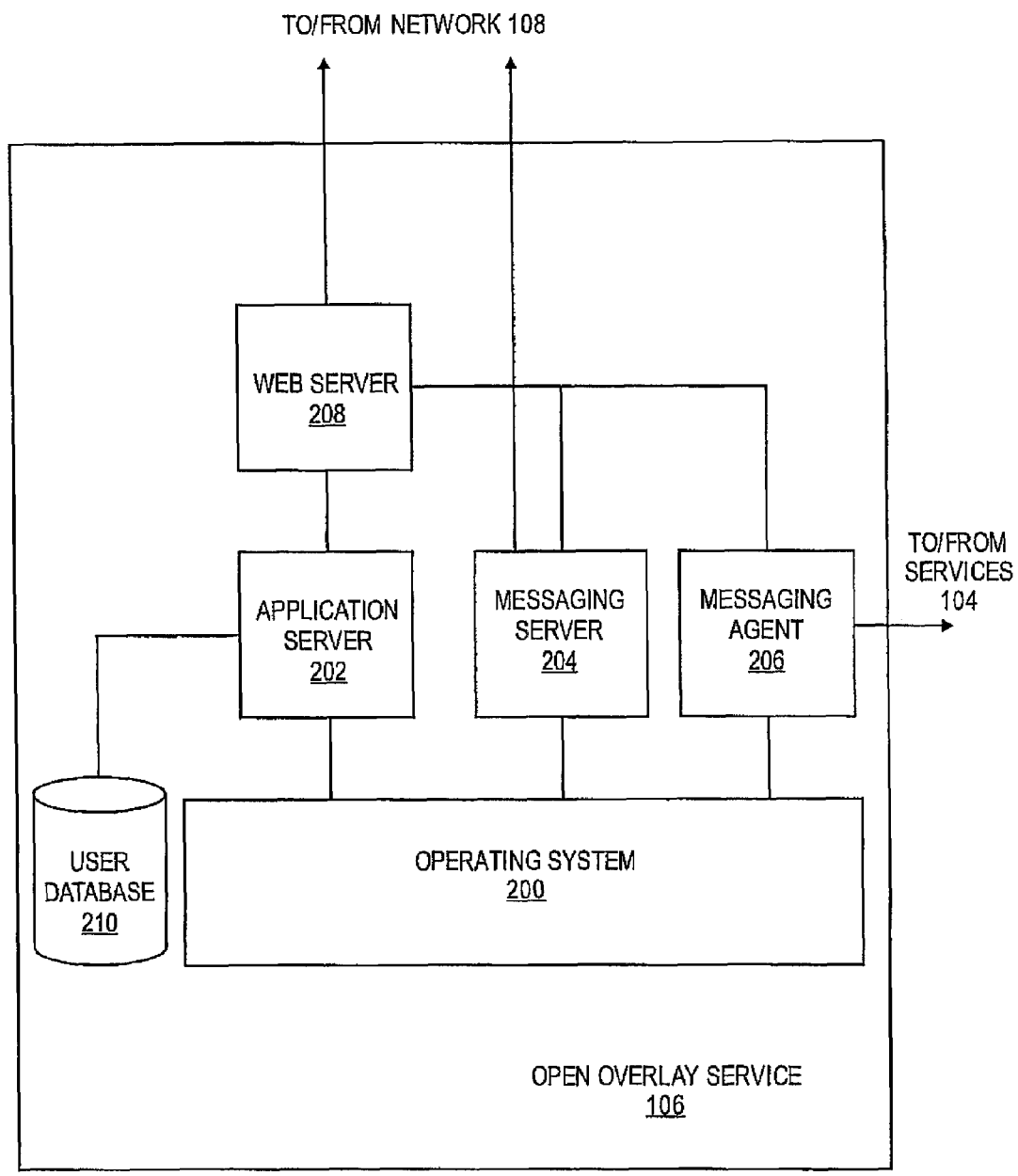
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
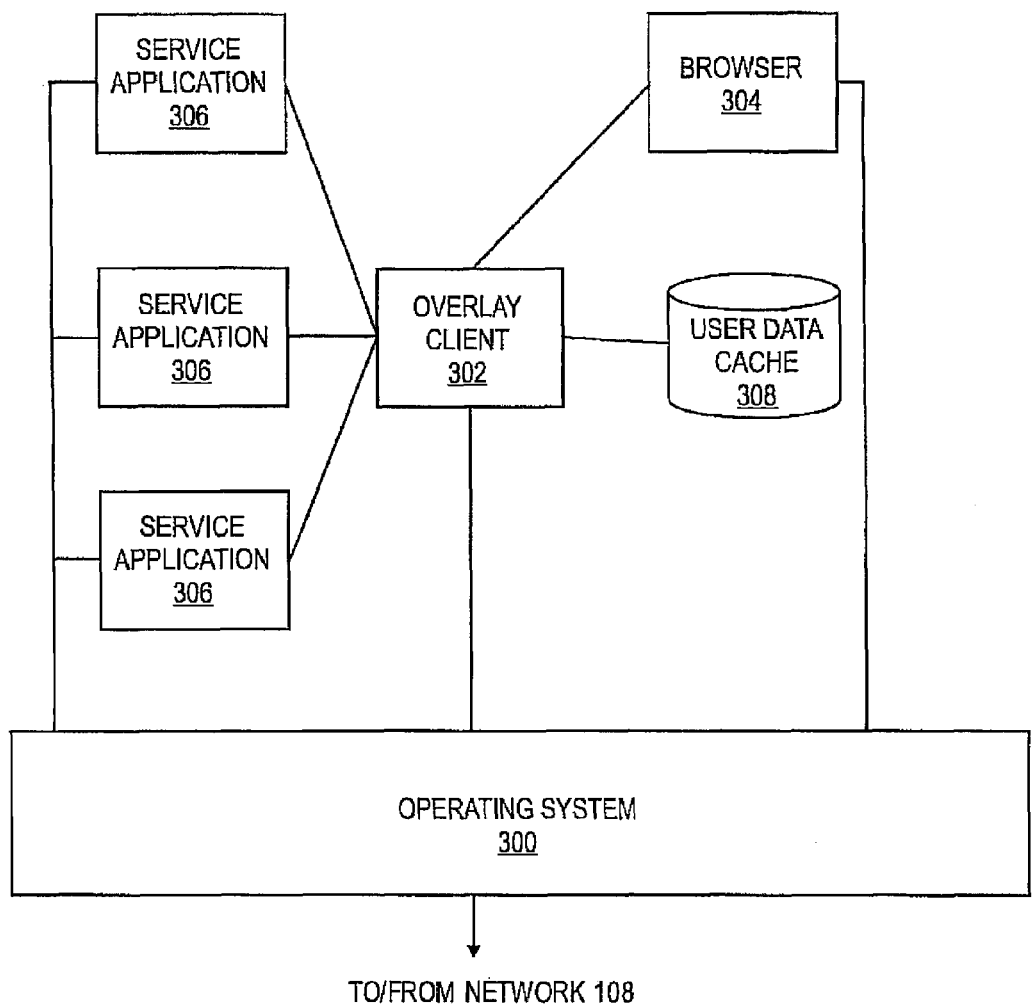
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order to illustrate-some of the features of open overlay service 106 that provide a live social context, a feature for allowing users to easily establish an account, without having to specifically request an account will now be described.

In general, open overlay service 106 lets users immediately create a temporary "anonymous" profile to try out the service prior to actually creating a permanent or persistent account. Alternatively, open overlay service 106 may create a temporary home page for the new user each time a current user invites a new user. Any activity using the temporary account or from the temporary home page is then appended to the persistent account when it is established. Open overlay service 106 may also automatically create a behavior profile for new users and then lets the new user configure their temporary account or home page based on this profile.

The temporary account or home page immediately allows the new user to begin using open overlay service 106, before they actually create an account. Any activity and experiences while using temporary account or home page is then saved to the permanent account use again later.

In some embodiments, open overlay service 106 allows a new user to browse around the service, jumping to external links, and browse through current user pages. At any of these pages, the new user is allowed to add that person or group as a "friend". Thus, open overlay service 106 allows a new user to establish their own social network even before their permanent account has been requested or set up.

Open overlay service 106 allows the new user to save their social network. This allows the new user to browse and collect interesting people as their friends. Open overlay service 106 may offer a temporary homepage where the new user can see the overview of all those peoples activity.

When a new user is adding friends, open overlay service 106 may provide a pop-up window. This pop-up may give information about what adding a friend does and what else the new user can do after adding a friend. A link to friend's home page would be provided in the pop-up so the new user can immediately go and see the changes they made.

In addition, open overlay service 106 may show multiple, different accounts the new friend just added is using and allow the new user to add their accounts of those types, as well. In the temporary home page, open overlay service 106 may provide a notice that the page is only temporary and that the new user will need to sign up for an account to continue using it.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A non-transitory computer readable medium having instructions that, when executed by a processing device, cause the processing device to perform operations comprising:

providing to a new user a temporary account associated with an online social networking service;

logging a plurality of activities performed by the new user while the new user accesses the online social networking service with the temporary account; and in view of determining that the new user seeks permanent access to the online social networking service, providing, by the processing device, to the new user a permanent account that reflects the plurality of activities that were logged while the new user accessed the online social networking service with the temporary account.

2. The non-transitory computer readable medium of claim 1, wherein logging the plurality of activities comprises saving an identity of a second user of the online social networking service with which the new user has shared content while using the temporary account, and wherein providing the permanent account that reflects the plurality of activities comprises adding the identity of the second user to the permanent account.

3. The non-transitory computer readable medium of claim 1, wherein logging the plurality of activities comprises saving an identity of a second user of the online social networking service with which the new user has shared messages while using the temporary account, and wherein providing the permanent account that reflects the plurality of activities comprises adding the identity of the second user to the permanent account.

4. The non-transitory computer readable medium of claim 1, wherein logging the plurality of activities comprises saving an identity of a group in the online social networking service that the new user has joined while using the temporary account, and wherein providing the permanent account that reflects the plurality of activities comprises adding the identity of the group to the permanent account.

5. The non-transitory computer readable medium of claim 1, wherein logging the plurality of activities comprises saving an identity of a second online service that the new user has linked to the temporary account, and wherein providing the permanent account that reflects the plurality of activities comprises adding the identity of the second online service to the permanent account.

6. The non-transitory computer readable medium of claim 1, wherein logging the plurality of activities comprises saving new contacts added by the new user to the temporary account, and wherein providing the permanent account that reflects the plurality of activities comprises adding the new contacts to the permanent account once the permanent account.

7. The non-transitory computer readable medium of claim 1, wherein the operations further comprise receiving a request from a current user of the online social networking service to add the new user to the online social networking service, and wherein providing the temporary account to the new user is in view of receiving the request to add the new user.

8. A method comprising:

providing to a new user a temporary account associated with an online social networking service;

logging a plurality of activities performed by the new user while the new user accesses the online social networking service with the temporary account; and in view of determining that the new user seeks permanent access to the online social networking service, providing, by the processing device, to the new user a permanent account that reflects the plurality of activities that were logged while the new user accessed the online social networking service with the temporary account.

9. The non transitory computer readable medium method of claim 8, wherein logging the plurality of activities comprises saving an identity of a second user of the online social networking service with which the new user has shared content or messages while using the temporary account, and wherein providing the permanent account that reflects the plurality of activities comprises adding the identity of the second user to the permanent account.

10. The method of claim 8, wherein logging the plurality of activities comprises saving an identity of a group in the online social networking service that the new user has joined while using the temporary account, and wherein providing the permanent account that reflects the plurality of activities comprises adding the identity of the group to the permanent account.

11. The method of claim 8, wherein logging the plurality of activities comprises saving an identity of a second online service that the new user has linked to the temporary account, and wherein providing the permanent account that reflects the plurality of activities comprises adding the identity of the second online service to the permanent account.

12. The method of claim 8, wherein logging the plurality of activities comprises saving new contacts added by the new user to the temporary account, and wherein providing the permanent account that reflects the plurality of activities comprises adding the new contacts to the permanent account.

13. The method of claim 8, further comprising receiving a request from a current user of the online social networking service to add the new user to the online social networking service, and wherein providing the temporary account to the new user is in view of receiving the request to add the new user.

14. A system comprising:
a memory to store instructions for an online social networking service; and
a processing device, coupled to the memory, to execute the instructions to:
provide to a new user a temporary account associated with the online social networking service;
log a plurality of activities performed by the new user while the new user accesses the online social networking service with the temporary account; and
in view of a determination that the new user seeks permanent access to the online social networking service, provide to the new user a permanent account that reflects the plurality of activities that were logged while the new user accessed the online social networking service with the temporary account.

15. The system of claim 14, wherein the processing device is to log the plurality of activities by recordation of an identity of a second user of the online social networking service with which the new user has shared content while using the temporary account, and wherein the processing device is to provide the permanent account that reflects the plurality of activities by addition of the identity of the second user to the permanent account.

16. The system of claim 14, wherein the processing device is to log the plurality of activities by recordation of an identity of a second user of the online social networking service with which the new user has shared messages while using the temporary account, and wherein the processing device is to provide the permanent account that reflects the plurality of activities by addition of the identity of the second user to the permanent account.

17. The system of claim 14, wherein the processing device is to log the plurality of activities by recordation of an identity of a group in the online social networking service that the new user has joined while using the temporary account, and wherein the processing device is to provide the permanent account that reflects the plurality of activities by addition of the identity of the group to the permanent account.

18. The system of claim 14, wherein the processing device is to log the plurality of activities by recordation of an identity of a second online service that the new user has linked to the temporary account, and wherein the processing device is to provide the permanent account that reflects the plurality of activities by addition of the identity of the second online service to the permanent account.

19. The system of claim 14, wherein the processing device is to log the plurality of activities by recordation of new contacts added by the new user to the temporary account, and wherein the processing device is to provide the permanent account that reflects the plurality of activities by addition of the new contacts to the permanent account.

20. The system of claim 14, wherein the processing device is further to receive a request from a current user of the online social networking service to add the new user to the online social networking service, and wherein the processing device is to provide the temporary account to the new user in view of receipt of the request to add the new user.

* * * * *

UNITED STATES PATENT AND TRADEMARK OFFICE
CERTIFICATE OF CORRECTION

| | | |
|---|---|---|
| PATENT NO. | : 8,638,912 B2 | Page 1 of 1 |
| APPLICATION NO. | : 13/231861 | |
| DATED | : January 28, 2014 | |
| INVENTOR(S) | : Bryan Clark | |

It is certified that error appears in the above-identified patent and that said Letters Patent is hereby corrected as shown below:

In the Claims

In claim 6, Column 8, Line 45: "the permanent account once the permanent account."

should be: "the permanent account."

In claim 9, Column 8, Line 64: "The non transitory computer readable medium method"

should be: "The method"

Signed and Sealed this
Second Day of September, 2014

Michelle K. Lee
*Deputy Director of the United States Patent and Trademark Office*